United States Patent
Tan et al.

(10) Patent No.: US 7,061,987 B1
(45) Date of Patent: Jun. 13, 2006

(54) WIDE-BAND ANALOG FRONT-END FOR DSL APPLICATIONS

(75) Inventors: Nianxiong Tan, Laguna Niguel, CA (US); Francis M. Caster, II, Dana Point, CA (US); Christian Eichrodt, Newport Beach, CA (US); Brian Borrong Horng, Irvine, CA (US); James J. Zhao, Tustin, CA (US)

(73) Assignee: Conexant, Inc., Red Bank, NJ (US)

( * ) Notice: Subject to any disclaimer, the term of this patent is extended or adjusted under 35 U.S.C. 154(b) by 768 days.

(21) Appl. No.: 10/214,341

(22) Filed: Aug. 6, 2002

Related U.S. Application Data (60) Provisional application No. 60/310,690, filed on Aug. 7, 2001, provisional application No. 60/310,668, filed on Aug. 7, 2001, provisional application No. 60/310,665, filed on Aug. 7, 2001, provisional application No. 60/310,692, filed on Aug. 7, 2001.

(51) Int. Cl.
*H04K 1/10* (2006.01)
(52) U.S. Cl. .................................................. 375/260
(58) Field of Classification Search ................ 375/260, 375/259, 295, 316; 379/399.01; 330/250; 370/276, 277, 282, 278; 455/73, 91, 130
See application file for complete search history.

(56) References Cited

U.S. PATENT DOCUMENTS

| | | | |
|---|---|---|---|
| 6,281,829 B1 | 8/2001 | Amrany et al. | 341/155 |
| 6,839,320 B1 * | 1/2005 | Paridaens et al. | 370/230 |
| 6,870,928 B1 * | 3/2005 | Conroy et al. | 379/399.01 |

OTHER PUBLICATIONS

Gustavson et al., U.S. Appl. No. 09/595,259 entitled High Performance Analog Front-End Architecture for Asynchronous Digital Subscriber Lines, filed Jun. 15, 2000, pp. 1-28.

* cited by examiner

*Primary Examiner*—Pankaj Kumar
(74) *Attorney, Agent, or Firm*—Thomas, Kayden, Horstemeyer, & Risley (57) ABSTRACT

An analog front-end circuit and method that supports multiple digital subscriber line (DSL) standards, including asymmetric digital subscriber line (ADSL) and very-high speed digital subscriber line (VDSL) is disclosed. The circuit incorporates multiple circuit blocks that can be selectively included into the transmit and receive paths of a DSL signal. It also permits selectable gain settings for signal amplifiers, and frequency bandwidth for signal filters that may be included in the transmit and receive paths. The receive path includes an analog-to-digital converter (ADC) that operates close to and exceeds the Nyquist sampling rate.

17 Claims, 5 Drawing Sheets

WIDE-BAND ANALOG FRONT-END FOR DSL APPLICATIONS

CROSS-REFERENCE TO RELATED APPLICATIONS

This application claims priority to the following co-pending U.S. provisional patent applications: a) U.S. Provisional Patent Application Ser. No. 60/310,690 filed on Aug. 7, 2001, and entitled "Quad AFE for DSL CO Applications," b) U.S. Provisional Patent Application Ser. No. 60/310,668, filed Aug. 7, 2001, and entitled "High-pass Receive Filter for VDSL," c) U.S. Provisional Patent Application Ser. No. 60/310,665, filed on Aug. 7, 2001 and entitled "ADC Buffer for High-bandwidth ADCs," and d) U.S. Provisional Patent Application Ser. No. 60/310,692, filed Aug. 7, 2001 and entitled "Automatic Tuning Technique for Analog Filters," which are all hereby incorporated by reference in their entirety.

This application is also related to the following co-pending U.S. utility patent applications: a) "Improved Active Filter And Method," having Ser. No. (unknown), filed Aug. 6, 2002, with U.S. Express Mail Package No. EL924321619US; b) "A Buffer Circuit For A High-Bandwidth Analog To Digital Converter," having Ser. No. (unknown), filed Aug. 6, 2002, with U.S. Express Mail Package No. EL924321605US; and c) "System And Method For Tuning An RC Continuous-Time Filter," having Ser. No. (unknown), filed Aug. 6, 2002, with U.S. Express Mail Package No. EL924321596US; which are all incorporated by reference herein in their entirety.

FIELD OF THE INVENTION

The present invention generally relates to digital subscriber line (DSL) systems. More specifically, the invention relates to a wide-band analog front-end device that is used to interface broadband DSL systems such as very-high speed DSL (VDSL), into a local loop.

DESCRIPTION OF THE RELATED ART

Digital subscriber loop (DSL) technology has provided a significant improvement in transmission speeds over a number of other transmission technologies that had been used over several transmission mediums. For example, asymmetric DSL (ADSL) proved particularly advantageous in transporting high-speed signals such as needed for Internet access by residential users, over the copper local loop. High-speed DSL (HDSL) provided high-speed signal transport over twisted-pair wires, covering distances that exceeded those obtained with T-1 transmission techniques. Symmetric DSL (SDSL) provided business users with economical high-speed connectivity, and Very-high speed DSL (VDSL) is being used to provide high-bandwidth services such as video delivery to residential customers over the copper loop.

Such a variety of DSL services is typically provided by a service provider using a digital subscriber line access multiplexer (DSLAM). First generation DSLAMs were typically located in central offices (COs), to serve multiple customers located within a customer serving area (CSA) centered around the CO. The CO environment provided advantages related to DSLAM installation, service, and maintenance. As DSL architectures evolved, DSLAMs were installed in alternative locations such as remotely-located digital loop carrier (DLC) cabinets, so as to extend DSL coverage to subscribers served by DLC systems. The DSLAMs installed in these alternative remote locations have been generally connected to a CO through a high-speed digital link, such as a synchronous optical network (SONET) optical link.

Certain network architectures, fiber-to-the-curb (FTTC) for example, utilize specialized remotes called Optical Network Units (ONUs) to provide high-bandwidth services to customers.

Whether installed in a CO, a DLC cabinet, or an ONU, a DSLAM typically contains several circuit packs that have been designed to provide specific types of DSL service. While a large number of these circuit packs are typically used to provide ADSL service to numerous customers, a smaller number of these circuit packs are used to provide other DSL services, such as SDSL, HDSL, and VDSL to customers who use these particular technologies.

The various DSL standards are often referred to collectively as a group, by the term "xDSL" where the letter "x" may be suitably replaced by an appropriate letter to define one particular type of DSL. The term xDSL typically encompasses DSL technologies such as ADSL, SDSL, ISDN digital subscriber line (IDSL), VDSL and HDSL.

Providing DSL service, especially ADSL service, is an extremely cost-sensitive issue, and telephone companies are constantly striving to reduce costs associated with DSL equipment purchase, installation, and maintenance. A large part of reducing costs associated with the purchase of DSL equipment, relates to minimizing the cost of circuit packs installed inside a DSLAM. This involves several aspects such as eliminating redundancy in hardware components, increasing packaging density, maximizing the use of identical parts over multiple circuit packs, integrating several components into modular packages, and designing universal hardware that can be selectively configured to address one of a variety of applications via control mechanisms such as switches, pins, jumpers, and software.

Figure 1:
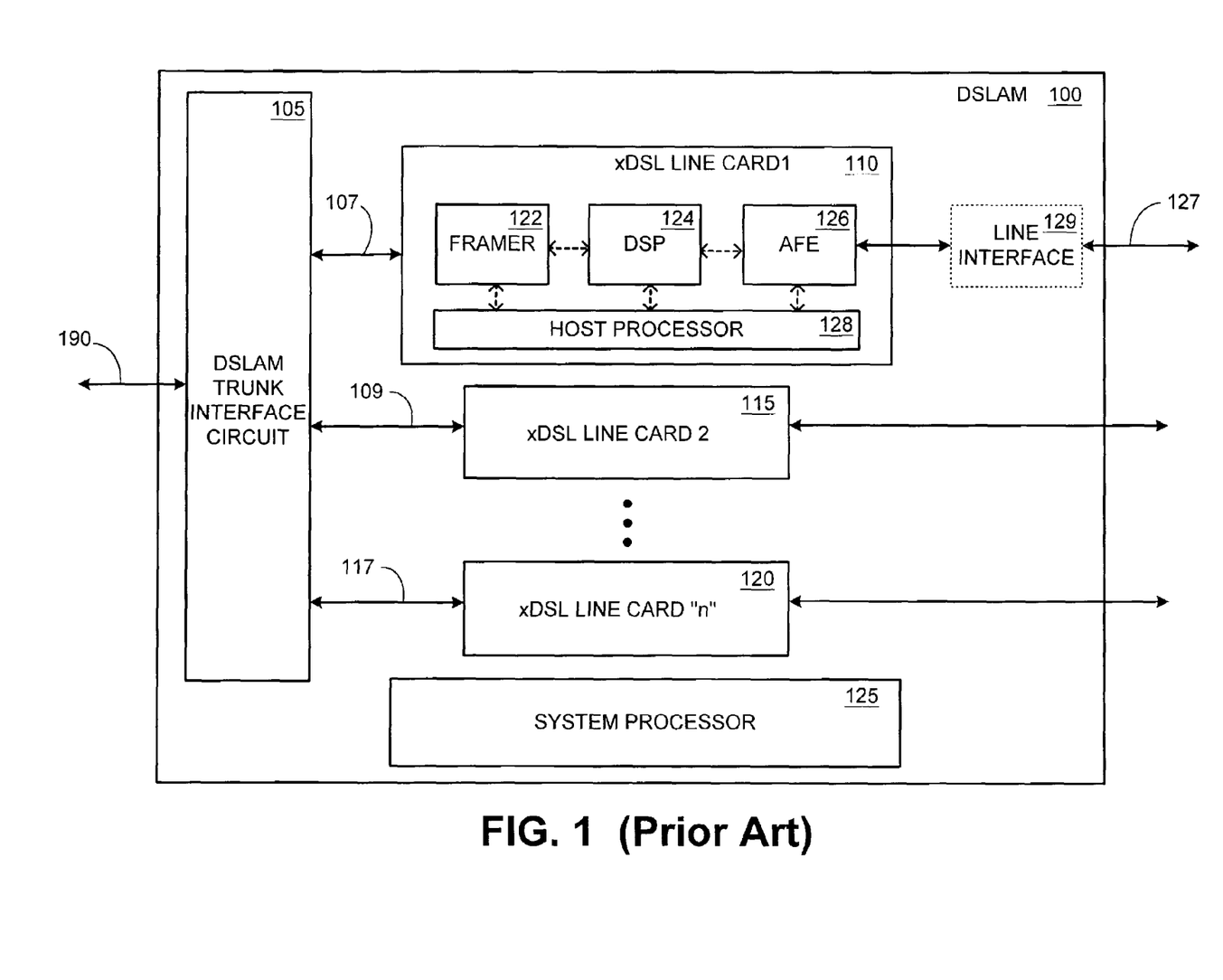
FIG. 1 is a block diagram representation of the main functional blocks inside a typical DSLAM. Main circuit functions on a typical xDSL line card that is installed inside the DSLAM, is also illustrated.

FIG. 1 is a block diagram representation of the main functional blocks inside a typical prior-art DSLAM 100. Main circuit functions on an xDSL line card 1 110 that is installed inside the DSLAM, is also illustrated.

The DSLAM trunk interface circuit 105, system processor 125, and the multiple xDSL line cards shown in FIG. 1 generally represent circuit packs that are plugged into a DSLAM chassis. The circuit pack architecture permits easy insertion and/or removal, thereby permitting a certain degree of flexibility in configuring the DSLAM 100 to provide various types of DSL service. It also allows relatively easy replacement of defective circuit packs, a replacement that may be carried out while the DSLAM is in operation without simultaneously affecting all of the multiple customers that are being provided DSL service.

The high-speed data link 190 of the DSLAM trunk interface circuit 105, connects DSLAM 100 to an edge switch (not shown) typically located in a CO. Data link 190 may carry data packets over various transport protocols, such as ATM, Ethernet, and TCP/IP. On the line-card side of the DSLAM trunk interface circuit 105, data links such as links 107, 109, and 117 connect the DSLAM trunk interface circuit 105 to multiple line cards.

"n" number of xDSL line cards are shown in FIG. 1. The value of "n" is a constantly increasing number, with typical values ranging from 12 to 48, as equipment designers attempt to integrate larger amounts of circuitry into DSLAMs. Line cards typically constitute the maximum number of circuit packs installed inside a DSLAM.

While xDSL line card 1 110, for example, may be configured to provide HDSL service to a business customer, xDSL line card 2 115 may be configured to provide ADSL service to a residential customer.

Certain elements that constitute important functional blocks of an xDSL circuit, are shown inside xDSL line card 1 110. Framer 122, digital signal processor (DSP) 124, and analog front end (AFE) 126 are used to convert a binary digital signal carried on link 107 from the DSLAM trunk interface circuit 105, into a downstream signal that is suitably formatted for transmission into link 127.

Typically, the AFE is interfaced into link 107 using a line interface 129 that is exemplifies several elements such as a line driver, a hybrid circuit, and a coupling transformer. While some of these elements may be incorporated inside the AFE 126 in certain applications, in certain other applications these elements may be provided as discrete elements located outside the AFE 126.

For providing HDSL service from xDSL line card 1 110, this conversion scheme may incorporate a 2B1Q format, while ADSL service may be provided by xDSL line card 2 115 using a discrete multi-tone (DMT) encoding format.

Framer 122, digital signal processor (DSP) 124, and analog front end (AFE) 126 are also used to process an upstream signal that is complementary to the downstream signal, and is received via link 127.

Host processor 128 on xDSL line card 1 110, is used to control the various elements such as framer 122 and DSP 124. This control is generally implemented by firmware and/or software that is stored in memory devices (not shown) associated with host processor 128.

Several other elements, such as signal filters, hybrid-circuits, and gain-setting amplifiers that are typically included in xDSL line card 1 110 have not been shown in FIG. 1.

System processor 125 is used for operations, administration, maintenance and provisioning (OAM&P) of the various circuit packs inside the DSLAM 100. For example, provisioning the DSLAM 100 may include such procedures as would be necessary to provide various types of DSL service via different types of xDSL line cards. Maintenance may include inventory procedures as well as failure reporting. System processor 125 interacts with various processors, such as the host processor 128, inside DSLAM 100 using system-level software and/or firmware.

While the circuitry shown in xDSL line card 1 110 of FIG. 1, indicates a single xDSL circuit, most line cards contain several such circuits. Therefore a single line card typically provides DSL services to several independent customers simultaneously. The duplication of individual xDSL circuits (incorporating elements such as Framer, DSP, and AFE) in this type of design, allows for certain schemes to optimize circuit operation.

One such scheme is implemented by sharing devices that provide common functionality over multiple circuits. For example, host processor 128 becomes more cost-effective if it is linked to more than a single framer and a DSP. It may therefore be shared over several xDSL circuits that are located on the xDSL line card 1 110.

Cost savings, as well as power-consumption reduction, is achieved by integrating multiple circuits into a single modular package. For example, several analog front-end circuits such as AFE 126, may be integrated into a single module. When four such AFE circuits are integrated into a single module, the assembly is referred to as a Quad AFE. Such a Quad AFE would be used to provide DSL service to four independent customers connected to xDSL line card 1 110. This modular packaging can be further enhanced by designing the Quad AFE for example, to be configurable to accommodating different types of DSL signals. While in one application it may serve as an ADSL interface, it may be re-configured in a second application to serve as a HDSL interface without changing the hardware in xDSL line card 1 110.

While existing AFEs may accommodate a few DSL technologies selectively, such devices are non-comprehensive in their coverage of all the DSL formats. One major shortcoming relates to bandwidth limitations that preclude the inclusion of large-bandwidth technologies such as VDSL. Another issue related to VDSL hardware is power consumption. Circuits that process large bandwidth signals typically consume more power than narrow-band circuits. This power-consumption issue related to a single VDSL circuit, is further compounded when several such VDSL circuits are placed inside a single package, thereby leading to heat dissipation problems, mean-time-between-failures (MTBF) reduction, and cross-talk issues.

SUMMARY OF THE INVENTION

The present invention provides systems and method for a digital subscriber line communication system using an analog front-end (AFE) circuit. In this regards, one such system uses an AFE circuit that processes very-high-speed digital line (VDSL) signals in a first operating mode, and processes asymmetric digital subscriber line (ADSL) signals in a second operating mode. This representative system may further comprise a third operating mode wherein the AFE circuit processes an xDSL signal.

Another embodiment may be described as a method of accommodating different digital subscriber line applications by a single analog front-end (AFE) circuit, comprising the steps of: selectively inserting signal filters into a transmitter circuit; providing transmit-digital data bits at a first input of the AFE; coupling a transmitted DSL signal at an AFE first output to a digital subscriber line; selectively inserting signal filters into a receiver circuit; providing a received DSL signal from a digital subscriber line to a second input of the AFE; and coupling receive-digital data bits at an AFE second output.

Other objects, features, and advantages of the present invention will become apparent to one skilled in the art upon examination of the following drawings and detailed description. It is intended that all such additional objects, features, and advantages be included herein within the scope of the present invention, as defined by the claims.

DESCRIPTION OF THE DRAWINGS

Many aspects of the invention can be better understood with reference to the following drawings. The components in the drawings are not necessarily drawn to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DSL network coverage over an extended CSA is traditionally provided by installing a DSLAM in a remote cabinet. In certain applications, such as fiber-to-the-curb (FTTC), this remote cabinet is referred to as an optical network unit (ONU). An ONU is also utilized in delivering high-bandwidth services, such as VDSL, where signal delivery must be provided over limited distances. The DSLAM typically communicates with an edge switch located in a CO via a high-speed digital trunk such as a SONET fiber-optic trunk.

In both its initial conception and its subsequent implementation, VDSL was seen as the natural evolution from ADSL, with higher asymmetric speeds—downstream rates up to 52 Mbps and upstream rates up to 6.4 Mbps. The primary drivers for VDSL included a growing demand for high-bandwidth multimedia applications that integrated voice, data, and video; and the availability of relatively cheap fiber in the ground. Installation of ONUs became especially popular in new residential developments and multi-dwelling units. Developers found that it was cost effective to lay fiber in conduits along with other utilities in a developing community. On the other hand, although backbone upgrades and new developments made it possible to get fiber close to the premises, it was still expensive to run fiber to every home or apartment unit.

Although ADSL and VDSL are related technologies, there are important differences between the two. The original idea of VDSL was to offer asymmetric service at higher speeds than ADSL. Since then, however, industry efforts began focusing on symmetric services as well. It is expected that asymmetric services will be provided primarily for residences and symmetric services mainly for businesses.

ADSL and VDSL are complementary in the frequency bands over which they operate. ADSL frequencies start above the plain-old-telephone-system (POTS) band and top off around 1.1 MHz. VDSL frequencies begin above the ADSL band and top off around 12 MHz.

Since VDSL is expected to operate with power supply limitations in remote cabinets, such as ONUs, the design requirements for VDSL transceivers are much more stringent.

VDSL is a natural complement to and a logical upgrade path from ADSL. As loop lengths shrink (either from natural proximity to a CO or from increased deployment of fiber-based access nodes), VDSL enables more channels and capacity for services that require high data rates. In other words, not only does VDSL support and enhance existing narrowband and broadband services; it enables new services that offer rich multimedia content.

Figure 2:
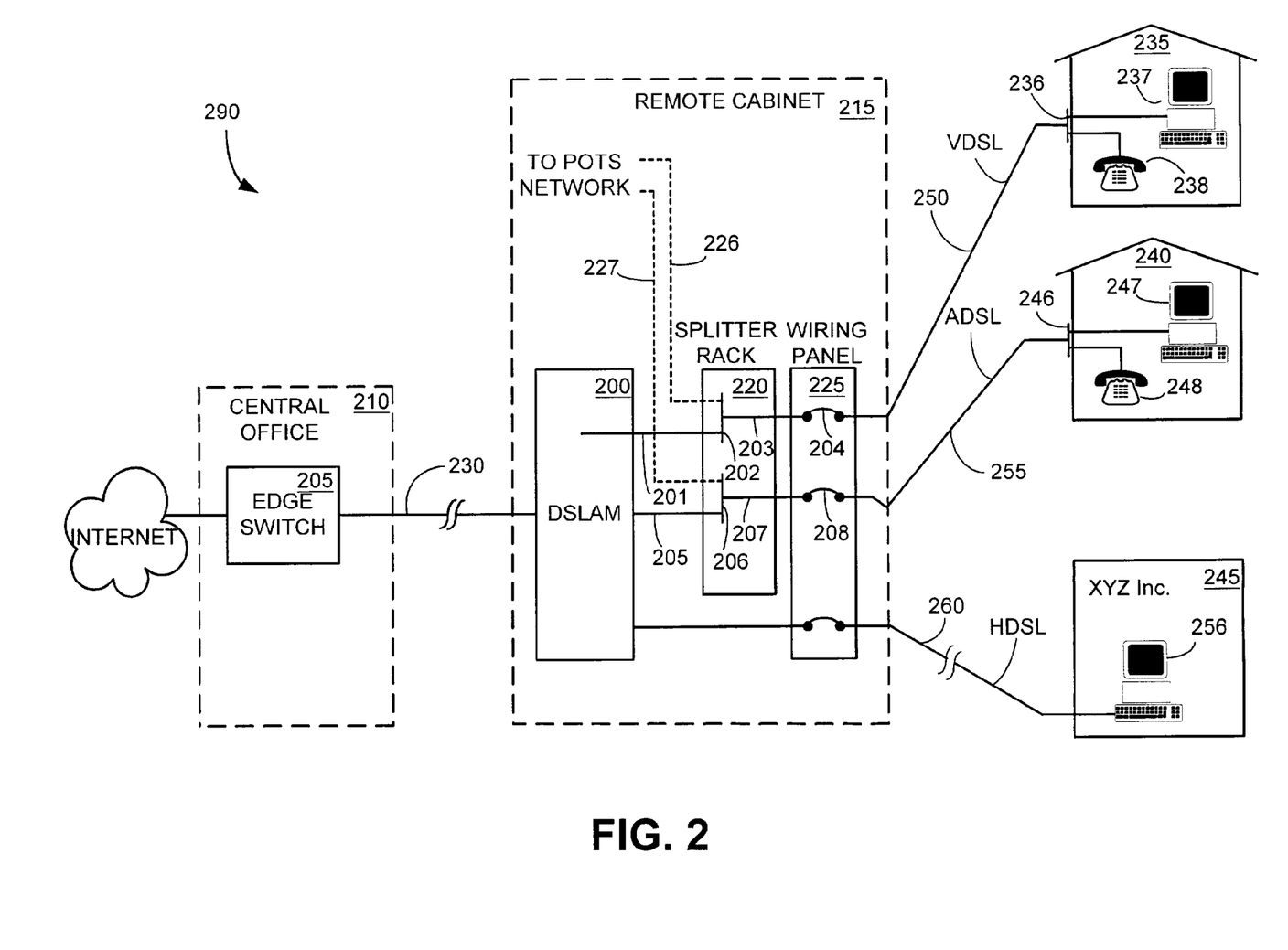
FIG. 2 illustrates a communication system that provides DSL service to multiple customers from a remote cabinet.

FIG. 2 illustrates a communication system 290 that provides DSL services from a remote cabinet 215 by utilizing a DSLAM 200 that incorporates the present invention.

On its trunk side, DSLAM 200 typically communicates with an edge switch 205 using high-speed digital trunk 230 which may be a fiber-optic link capable of supporting wavelength-division-multiplexing (WDM) and utilizes technologies such as SONET and Gigabit Ethernet.

On its line side, DSLAM 200 uses several line-side connections to provide various forms of DSL service to multiple customers. FIG. 2 shows three such exemplar customers. The first customer is a residential user utilizing VDSL in residence 235, the second customer is a second residential user utilizing ADSL services in residence 240, while the third customer is a business customer using HDSL in a business location 245.

While there are several implementation issues related to the simultaneous delivery of multiple types of DSL services over wires bundled together at a CO—cross-talk for example, FIG. 2 is used to illustrate the individual operating structure of multiple types of DSL technologies. Constant progress in technology and in implementation techniques are overcoming these implementation issues, and further improvements will ensure total compatibility for co-existing DSL services.

Full-rate ADSL and VDSL technology utilize signal splitters to isolate base-band voice signals from DSL data signals. Splitter rack 220 in the remote cabinet 215, contains multiple splitters and is connected to DSLAM 200 for routing DSL data signals from/to the DSLAM 200.

It may be relevant to point out, that while FIG. 2 depicts the splitter rack 220 as existing external to DSLAM 200, several system configurations may physically incorporate the splitter functionality inside the DSLAM 200.

Splitter 203 used here for explanation purposes in a VDSL application, combines the downstream VDSL signal that is transmitted by the DSLAM 200 over link 201, with the analog voice frequency (VF) signal carried from the plain-old-telephone-system (POTS) network over link 226. The combined downstream signal is then transmitted to the wiring panel 225 via link 203.

Wires entering and exiting the remote cabinet 215 are interconnected using jumpers, such as jumper 204 in the wiring panel 225. The downstream VDSL signal together with the downstream analog VF signal that is present at jumper 204 is connected by the twisted wire pair 250 to the residence 235. Splitter 236 is located on the outside wall of residence 235, and splits the signal transmitted via twisted wire pair 250, into an analog VF signal and a downstream VDSL data signal. The analog VF signal may be routed to a telephone 238, while the downstream VDSL data signal is connected to a video monitor 237. Video monitor 237 may be a PC or may be a stand-alone display device. The downstream VDSL signal entering video monitor 237 is generally routed to a VDSL modem that may be installed internally or externally to the video monitor 237.

An upstream VDSL data signal that may be generated by video monitor 237, together with the upstream analog VF signal from telephone 238 is transmitted from the residence 235 towards the remote cabinet 215 over the same external twisted wire pair 250.

While providing VDSL service to residence 235, DSLAM 200 may be used to provide ADSL service to residence 240 also. Splitter 206 used here for explanation purposes in a full-rate ADSL application, combines the downstream ADSL signal that is transmitted by the DSLAM 200 over link 205, with the analog voice frequency (VF) signal carried from the plain-old-telephone-system (POTS) network over link 227. The combined downstream signal is then transmitted to the wiring panel 225 via link 207.

The downstream ADSL signal together with the downstream analog VF signal that is present at jumper 208 is connected by the twisted wire pair 255 to the residence 240. Splitter 246 is located on the outside wall of residence 240, and splits the signal transmitted via twisted wire pair 255, into an analog VF signal and a downstream ADSL data signal. The analog VF signal may be routed to a telephone 248, while the downstream ADSL data signal is connected to a PC 247. The downstream ADSL signal entering PC 247 is generally routed to an ADSL modem that may be installed inside the PC 247 or may be installed as an external modem that is connected by a cable to the PC 247.

An upstream ADSL data signal generated by PC 247, together with the upstream analog VF signal from telephone 248 is transmitted from the residence 240 towards the remote cabinet 215 over the same external twisted wire pair 255.

FIG. 2 also illustrates a HDSL connection that connects DSLAM 200 a business customer in a business location 245. The PC that is shown inside business location 245 illustrates a customer premise equipment (CPE) 256. CPE 256 typically incorporates a modem, which in this case is a HDSL modem. The modem may be an independent device serving one individual user or may be a modem incorporated into a server that is a part of a local area network (LAN) inside business location 245.

Figure 3:
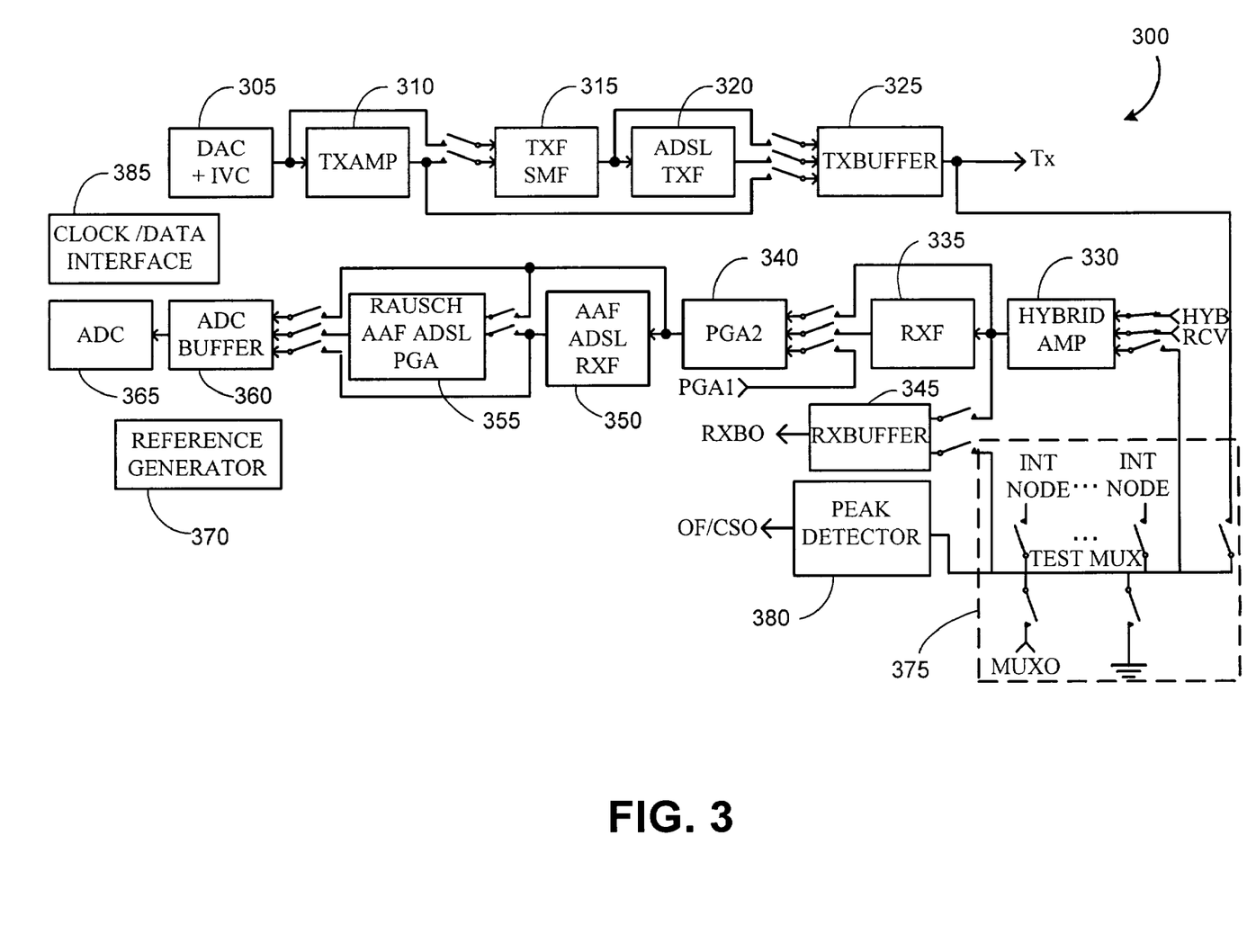
FIG. 3 depicts the functional blocks inside the AFE device of the invention.

Having previously described in FIG. 1, a prior-art block diagram representation of the main functional blocks inside a typical DSLAM together with the AFE that is inside one of these functional blocks—an xDSL line card, reference is now directed to FIG. 3.

FIG. 3 depicts the functional blocks inside the AFE 300 device of the invention. AFE 300 device is located on an xDSL line card installed inside DSLAM 200 of FIG. 2. Because DSLAM 200 is designed to offer several types of DSL services to multiple customers, it is desirable that an AFE device used in such an application be capable of accommodating multiple DSL technologies, including VDSL. Devices incorporating large-bandwidth technologies such as VDSL tend to be very power hungry and are susceptible to a number of other problems related to high-frequency effects.

AFE 300 accommodates multiple DSL technologies, consumes low power, has a high level of component integration, and is programmable to accommodate several circuit configurations on an xDSL line card. AFE 300 can be used for asymmetric applications such as ADSL, as well as symmetric applications such as SDSL. Unlike several other AFEs that use over-sampling techniques in analog-to-digital converters (ADCs) and digital-to-analog converters (DACs), AFE 300 uses Nyquist-based ADC and DAC circuitry that accommodate wide-band signals such as VDSL in an optimal manner.

AFE 300 is a quad device wherein four similar circuits have been incorporated inside an integrated circuit package, and each of the four circuit includes various filter such as xDSL transmit and receive filters, thereby providing a high level of component integration. As is known to persons of ordinary skill in the art, the integrated circuit package may be implemented in several ways. For example, this package may be a dual-in-line package (DIP), a single-in-line package (SIP), or a quad surface mount (SMT) package. This high level of integration translates to improved circuit density on an xDSL line card, which further translates to improved system component density on a DSLAM into which such an xDSL line card may be installed AFE 300 also incorporates several programming functions allowing optional settings for various parameters such as circuit by-pass, amplifier gain, filter cut-off bandwidth, and input impedance matching. These optional settings permit a common AFE circuit (one of the four such circuits available inside AFE 300) to process one of multiple DSL formats depending on the operating mode selected. For example, in an VDSL application, the AFE circuit may be configured to process VDSL signals in a first operating mode that is defined by the optional settings carried out upon the AFE 300. Subsequently, the AFE circuit may be re-configured to process ADSL signals in an ADSL application, by using a second operating mode that is defined by a different set of optional settings carried out upon the AFE 300. The AFE circuits contained in AFE 300 are capable of processing the family of xDSL signals, and will accommodate multiple DSL standards depending on the operating mode that is selected.

AFE 300 provides test circuitry to verify accurate circuit operation and measurement of various circuit parameters inside AFE 300.

Having outlined several advantageous features of the AFE 300, the elements of FIG. 2 will be explained in greater detail.

DAC 305, TXAMP 310, TXF SMF 315, ADSL TXF 320, and TXBUFFER 325 are elements that may be included in a transmit signal path inside AFE 300. A digital signal that is fed into DAC 305, appears as an analog signal at the output of TXBUFFER 325 that can be connected into a DSL transmission line via suitable circuitry including a line-driver, and a line-transformer.

DAC 305 comprises a digital-to-analog converter and a current-to-voltage converter (labeled IVC, where I represents current). To achieve the large bandwidth needed to accommodate signals such as VDSL, DAC 305 uses current-steering circuitry with variable output currents. DAC 305 can accept either 10-bit or 12-bit digital inputs that are converted by DAC 305 into an output current that is representative of the digital input at any particular instance in time. The value of this output current can be programmably adjusted by adjusting a bias current associated with DAC 305. The bias current is typically derived from a circuit that incorporates circuitry to compensate for temperature variations, thereby ensuring that the bias current is relatively independent of negative parameters such as current drift and fluctuations due to temperature variations.

The IVC associated with DAC 305, converts the output current of the digital-to-analog converter circuit into a proportional voltage. This output voltage is made available through a differential amplifier in DAC 305 that is used to drive the transmit-gain amplifier—TXAMP 310. TXAMP 310 provides voltage gain, in a range of 4 to 7 dB in 1 dB step sizes, to the voltage signal obtained from the IVC associated with DAC 305. TXAMP 310 can be programmably by-passed if such voltage gain is undesirable.

Smoothing filter TXF SMF 315 rejects image frequencies, and can also be used as a transmit filter to reduce the noise that may be transmitted into a receive frequency band. Typically, this smoothing filter is a fourth-order elliptic filter whose cut-off frequency is pre-set by a trimming process at the time of manufacture of the AFE 300. The cut-off frequencies may be optionally set at 1.1, 3, 3.75, and 8.5 MHz. Automatic temperature tuning is included in the filter circuitry.

ADSL transmit filter ADSL TXF 320 is included in the transmit signal path only when AFE 300 is used for an ADSL system. It can be programmably by-passed for other DSL system applications. Typically, this ADSL transmit filter has a cut-off frequency selectable between 138 kHz, and 276 kHz. This cut-off frequency is pre-set by a trimming process at the time of manufacture of the AFE 300. TXF SMF 315 accepts one of two input signals—the voltage signal driven out by DAC 305, or the output signal of the transmit amplifier TX AMP 310.

TXF SMF 315 and ADSL TXF 320 can be jointly by-passed to simultaneously eliminate both elements from the transmit signal path. Transmit buffer TXBUFFER 325 provides an attenuation feature that provides at least 20 dB of attenuation in 2 dB resolution steps to a transmitted analog signal. It can also provide some line-driving capability, including a gain of 4 dB, if needed by any particular application. The driving capability is programmable, TXBUFFER 325 is capable of a muting function that may be needed for certain applications such as Annex C, and Annex H, where the transmission is carried out in a ping-pong mode. As indicated by FIG. 3, the inputs for TXBUFFER 325 may be selectively connected to any one of the outputs of TXAMP 310, TXF SMF 315, or ADSL TXF 320.

HYBRID AMP 330, RXF 335, PGA2 340, AAF ADSL RXF 350, RAUSCH AAF ADSL PGA 355, ADC BUFFER 360, and ADC 365 are elements that may be included in a receive signal path inside AFE 300. An analog signal that is received via circuitry connected to a DSL line, is fed into HYBRID AMP 330, and appears as a digital signal at the output of ADC 365 after having traversed the receive signal path.

HYBRID AMP 330 is a first-stage programmable gain amplifier with a wideband frequency response that is independent of the gain setting. It has a typical operating voltage gain range of −6 dB to +24 dB. Its input impedance is selectable between 50 ohms and 600 ohms thereby allowing it to be interfaced into external circuitry of correspondingly matched output impedances. The input signals to HYBRID AMP 330 may be derived from one of three different sources—an external hybrid circuit, an external receiver circuit, or an internal test multiplexer circuit contained inside AFE 300.

The receive high-pass filter RXF 335 which is typically a third-order elliptic filter is used to eliminate unwanted high frequencies. Removing these unwanted frequencies is desirable in minimizing the design specification requirements of ADC 365, and relaxing the accuracy requirements of the analog-to-digital conversion. Typical cut-off frequencies are 3, 3.75, and 4 MHz. RXF 335 may be programmably by-passed if it is not needed for any particular application.

A programmable gain amplifier, PGA2 340 provides programmable gain up to 23 dB, with a typical step resolution of 1 dB. The input signals to PGA2 340 may be derived from one of three different sources—HYBRID AMP 330, RXF 335, or another amplifier labeled PGA 1, that is located outside AFE 300. AAF ADSL RXF 350 is a dual purpose filter that can be either used as an anti-aliasing filter, or as a receive signal filter. When used as an anti-aliasing filter, AAF ADSL RXF 350 prevents noise-aliasing at the input stage of the ADC 365. Typically, a third-order elliptic filter with cut-off frequency of 5.2 MHz is used to implement this circuit. This filtering is desirable as the ADC 365 uses a Nyquist approach rather than an over-sampling technique.

When used as a receive signal filter for an ADSL application, AAF ADSL RXF 350 has a selectable cut-off frequency of either 138 kHz (Annex A) or 276 kHz (Annex B). AAF ADSL RXF 350 may be selectively by-passed when not needed for a particular application.

RAUSCH AAF ADSL PGA 355 incorporates a filter circuit that can be used as an anti-aliasing filter for VDSL signals. RAUSCH AAF ADSL PGA 355 can also be used to provide programmable gain to a signal that has been transmitted through AAF ADSL RXF 350 configured as a receive filter circuit. The filter cut-off frequency may be set at a typical value of 5.2 MHz for VDSL, and at either of two frequencies, 138 kHz or 276 kHz, for ADSL signals. The gain can be programmed up to 10 dB in steps of 1.5 dB. RAUSCH AAF ADSL PGA 355 may be selectively by-passed where not required.

ADC BUFFER 360 is a wide-band buffer circuit that drives ADC 365. It may be selected to accept one of three signals from three different sources—PGA2 340, AAF ADSL RXF 350, or RAUSCH AAF ADSL PGA 355. It is programmable for different bandwidths depending on specific applications.

ADC 365 is a pipeline analog-to-digital converter with a maximum resolution of 14 bits. ADC 365 accommodates wide-band signal inputs such as VDSL, and avoids the use of over-sampling techniques that require high clock rates with their attendant issues of implementation and operation such as cross-talk and electromagnetic interference (EMI). The sampling clock operates at a frequency which is just above the Nyquist rate associated with a received DSL signal bandwidth. For example, with a received signal bandwidth of 5.2 MHz, the Nyquist rate is 10.4 MHz, and the ADC sampling clock may be selected, in one particular application, to operate at 19 MHz. The clock frequency of 19 MHz is chosen based on circuit implementation preferences, and while it exceeds the Nyquist rate it remains close to it without approaching values that are more appropriate for other types of ADCs that use over-sampling techniques.

TEST MULTIPLEXER 375 can be selectively programmed to access all the internal nodes of AFE 300, via input and output connections such as RXBO and MUXO.

REFERENCE GENERATOR 370 comprises the bandgap reference and current generator that is used by several components, such as DAC 305 inside AFE 300. RXBUFFER 345 is provided as a means to allow an external filter to be used in conjunction with AFE 300. RXBUFFER 345 may be set to provide gains of 0, 2, or 4 dB, and can be bypassed if unneeded.

CLOCK/DATA INTERFACE 385 is used to provide clock signals to AFE 300. It is also used to transmit data into the DAC 305, and receive data from ADC 365. Data transmission is synchronous and uses both edges of the clock in a scheme referred to in the industry as a double-data rate interface.

Figure 4:
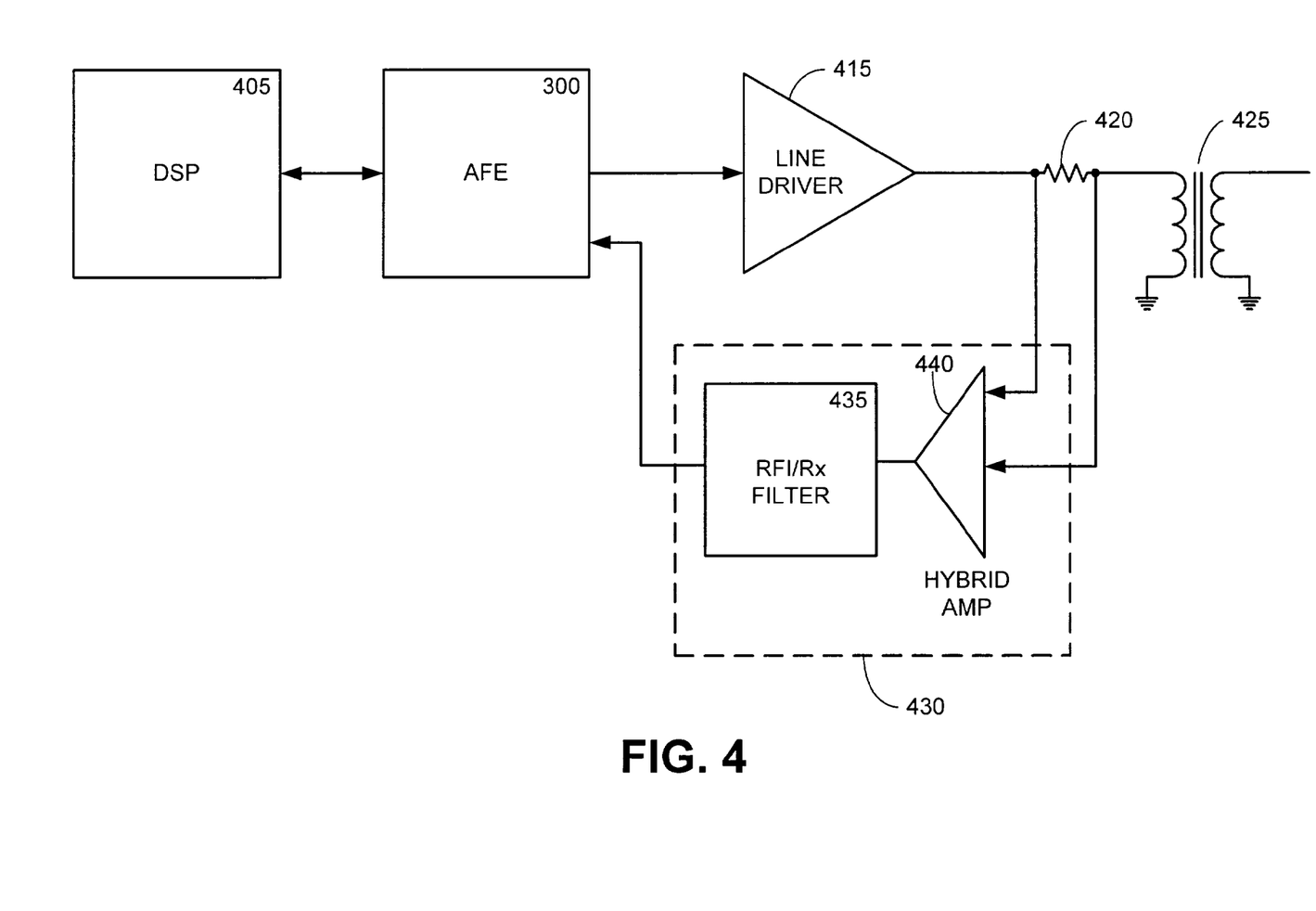
FIG. 4 illustrates incorporation of AFE 300 in a circuit that has low-hybrid-loss.

Having described the functional blocks inside AFE 300 of the invention, attention is now drawn to FIG. 4 which illustrates incorporation of AFE 300 in a low-hybrid-loss circuit application. In transceiver applications that share a bi-directional transmission path, a part of the transmitted signal is coupled into the receive path, due to variations in the line impedances of telephone lines. Hybrid-loss is a measure of the undesirable coupling of this transmitted signal into the receiver circuit. A hybrid circuit is used o reduce the amount of coupling.

DSP 405 carries out the signal processing functions that are necessary to translate upstream and downstream xDSL signals into a digital format that can be used by the AFE 300.

Line driver 415 is shown as a single-ended driver which drives a signal into transformer 425 that is coupled into a DSL line. The single-ended configuration is used for illustration purposes only. Typical applications use a differential configuration that is more suitable for hybrid-circuit interfacing and receiving DSL signals from a duplex communication link such as the DSL line. HYBRID AMP 440 provides signal gain for a received DSL signal that appears across resistor 420, which is a back-matching resistor. RFI/Rx filter 435 is included to eliminate unwanted out-of-band signals and reduce noise from the amplified DSL signal.

Circuit 430 comprising HYBRID AMP 440 and RFI/Rx FILTER 435, constitutes a part of a low-loss hybrid circuit that is connected into AFE 300. Such a circuit eliminates the need to utilize circuit blocks such as the high-gain of HYBRID AMP 330 inside AFE 300. With this configuration, the internal hybrid amplifier 330 is used solely as a gain stage.

Figure 5:
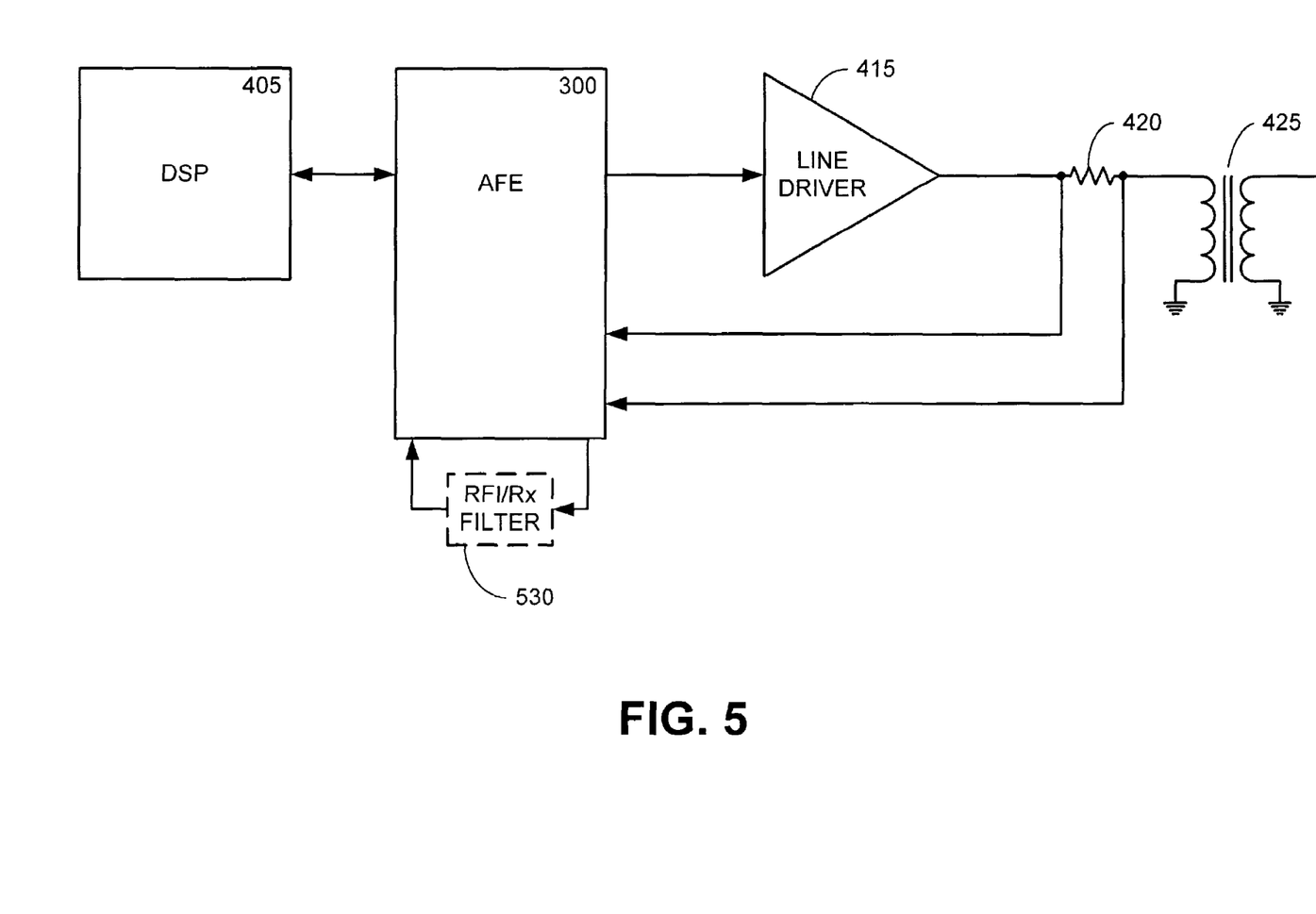
FIG. 5 illustrates incorporation of AFE 300 in a circuit that has high-hybrid-loss.

FIG. 5 illustrates a circuit which may be used when the hybrid loss is large (greater than 12 dB). In such an application, the internal HYBRID AMP 330 can be used. An external filter, such as RFI/Rx FILTER 530 may be optionally connected to AFE 300.

It should be emphasized that the above-described embodiments of the present invention are merely possible examples of implementations, merely set forth for a clear understanding of the principles of the invention. Many variations and modifications may be made to the above-described embodiment of the invention without departing substantially from the spirit and principles of the invention.

All such modifications and variations are intended to be included herein within the scope of the present invention and protected by the following claims.

The invention claimed is:

1. A wideband analog front-end (AFE) circuit for digital subscriber line (DSL) systems, comprising:
   a current-steering digital to analog converter (DAC) configured to receive a set of digital data bits at an AFE input and to provide a first current output that is a representation of the set of digital data bits at a DAC output;
   a current-to-voltage converter coupled to the DAC output, the converter configured to receive the first current output and to provide a first voltage output that is a representation of the first current output at a converter output;
   a transmit amplifier TXAMP coupled to the converter output, the TXAMP configured to provide a voltage gain to the first voltage output at an amplifier output;
   a smoothing filter TXF SMF coupled to the amplifier output, the TXF SMF configured to remove unwanted frequency components from the first voltage output and to provide a first filtered output signal at a filter output;
   an asymmetric digital subscriber line (ADSL) transmit filter ADSL TXF coupled to the filter output, the ADSL TXF configured to remove frequency components existing outside an ADSL transmit frequency spectrum in the first filtered output signal and to provide an ADSL transmit signal at a second filter output;
   a transmit buffer TXBUFFER coupled to the second filter output, the TXBUFFER configured to receive the ADSL transmit signal and to provide a buffered signal output at an AFE output;
   a hybrid amplifier HYBRID AMP configured to receive an analog DSL signal from a second AFE input, and to provide an amplified DSL signal at a hybrid amplifier output;
   a receive filter RXF coupled to the hybrid amplifier output, the RXF configured to remove unwanted frequency components from the amplified DSL signal and to provide a filtered receive signal at a receive filter output;
   a programmable-gain-amplifier PGA2 coupled to the receive filter output, the PGA2 configured to receive the filtered receive signal and to provide an amplified receive signal at a PGA output;
   an ADSL receive filter AAF ADSL RXF coupled to the PGA output, the AAF ADSL RXF configured to receive the amplified receive signal, remove unwanted frequency components from the amplified receive signal and to provide a second filtered receive signal at an AAF output;
   a Rausch filter amplifier AAF ADSL PGA coupled to the AAF output, the AAF ADSL PGA configured to receive the second filtered receive signal, remove unwanted frequency components from the second filtered receive signal and to provide a third filtered receive signal at a Rausch output;
   an analog-to-digital converter (ADC) buffer coupled to the Rausch output, the buffer configured to receive the third filtered receive signal and to provide a buffered receive signal at a receive buffer output; and
   an analog-to-digital converter (ADC) coupled to the receive buffer output, the ADC configured to receive the buffered receive signal and to provide a digital representation of the buffered receive signal at a second AFE output.

2. The circuit of claim 1, further comprising:
   a receive signal buffer RXBUFFER coupled to the hybrid amplifier output configured to provide a buffered amplified DSL signal at a third AFE output RXBO; and
   a signal interface circuit clock/data interface configured to interface digital data bits with the AFE circuit using rising and falling edges of a clock signal.

3. The circuit of claim 1, further comprising:
   a selector means to uncouple the converter output from the smoothing filter TXF SMF, and couple the amplifier output to the smoothing filter TXF SMF.

4. The circuit of claim 1, further comprising:
   a second selector means to uncouple the second filter output from the transmit buffer TXBUFFER, and couple the filter output to the transmit buffer TXBUFFER.

5. The circuit of claim 4, wherein the second selector means is used to uncouple the filter output from the transmit buffer TXBUFFER, and couple the amplifier output to the transmit buffer TXBUFFER.

6. The circuit of claim 1, further comprising:
   a third selector means to uncouple the hybrid amplifier HYBRID AMP from the second AFE input and couple the hybrid amplifier HYBRID AMP to a third AFE input.

7. The circuit of claim 6, wherein the third selector means is used to uncouple the hybrid amplifier HYBRID AMP from the third AFE input and couple the hybrid amplifier HYBRID AMP to a test multiplexer TEST MULTIPLEXER.

8. The circuit of claim 1, further comprising:
   a fourth selector means to uncouple the programmable-gain-amplifier PGA2 from the receive filter output and couple the programmable-gain-amplifier PGA2 to the hybrid amplifier output.

9. The circuit of claim 1, further comprising:
   a fifth selector means to uncouple the Rausch filter amplifier AAF ADSL PGA from the AAF output and couple the Rausch filter amplifier AAF ADSL PGA to the PGA output.

10. The circuit of claim 1, further comprising:
a sixth selector means to uncouple the analog-to-digital converter (ADC) buffer coupled to the Rausch output, and couple the analog-to-digital converter (ADC) buffer to the PGA output.

11. The circuit of claim 10, wherein the sixth selector means is used to uncouple the analog-to-digital converter (ADC) buffer from the PGA output, and couple the analog-to-digital converter (ADC) buffer to the AAF output.

12. The circuit of claim 1, wherein the ADC uses a sampling clock of a frequency that is close to and exceeds the Nyquist sampling rate of the analog DSL signal.

13. A wideband analog front-end (AFE) circuit for digital subscriber line (DSL) systems, comprising:
a transmitter circuit contained in an integrated circuit package, the transmitter circuit configured to receive a first set of digital data bits at a first AFE input and to provide a very-high-speed digital subscriber line (VDSL) transmit signal at a first AFE output; and
a receiver circuit contained in the integrated circuit package, the receiver circuit configured to receive a very-high-speed digital subscriber line (VDSL) receive signal at a second AFE input and to provide a second set of digital data bits at a second AFE output, further comprising:
a first selector means in the transmitter circuit to configure the transmitter circuit to receive a third set of digital data bits at the first AFE input and to provide an asymmetric digital subscriber line (ADSL) transmit signal at the first AFE output; and
a second selector means in the receiver circuit to configure the receiver circuit to receive an asymmetric digital subscriber line (ADSL) receive signal at the second AFE input and to provide a fourth set of digital data bits at the second AFE output.

14. A wideband analog front-end (AFE) circuit for digital subscriber line (DSL) systems, comprising:
a transmitter circuit contained in an integrated circuit package, the transmitter circuit configured to receive a first set of digital data bits at a first AFE input and to provide a very-high-speed digital subscriber line (VDSL) transmit signal at a first AFE output; and
a receiver circuit contained in the integrated circuit package, the receiver circuit configured to receive a very-high-speed digital subscriber line (VDSL) receive signal at a second AFE input and to provide a second set of digital data bits at a second AFE output, further comprising:
a first selector means in the transmitter circuit to configure the transmitter circuit to receive a third set of digital data bits at the first AFE input and to provide a digital subscriber line (DSL) transmit signal at the first AFE output; and
a second selector means in the receiver circuit to configure the receiver circuit to receive a digital subscriber line (DSL) receive signal at the second AFE input and to provide a fourth set of digital data bits at the second AFE output.

15. A method of accommodating different digital subscriber line applications by a single analog front-end (AFE) circuit, comprising the steps of:
selectively inserting signal filters into a transmitter circuit;
providing transmit-digital data bits at a first input of the AFE;
coupling a transmitted DSL signal at an AFE first output to a digital subscriber line;
selectively inserting signal filters into a receiver circuit;
providing a received DSL signal from a digital subscriber line to a second input of the AFE; and
coupling receive-digital data bits at an AFE second output.

16. The method of claim 15, further comprising the steps of:
selecting a first signal gain of the transmitter circuit; and
selecting a second signal gain of the receiver circuit.

17. The method of claim 15, further comprising the steps of:
selecting a transmission signal bandwidth of the transmitter circuit; and
selecting a received signal bandwidth of the receiver circuit.

* * * * *